United States Patent
Stark et al.

(10) Patent No.: US 11,980,124 B2
(45) Date of Patent: May 14, 2024

(54) ROBOTIC LAWN MOWER WITH SENSOR FOR DETECTING RELATIVE MOVEMENT BETWEEN BODY PARTS OF THE LAWN MOWER

(71) Applicant: HUSQVARNA AB, Huskvarna (SE)

(72) Inventors: Stefan Stark, Huskvarna (SE); Svante Larsson, Eksjö (SE); Staffan Palm, Hok (SE)

(73) Assignee: HUSQVARNA AB, Huskvarna (SE)

( * ) Notice: Subject to any disclaimer, the term of this patent is extended or adjusted under 35 U.S.C. 154(b) by 705 days.

(21) Appl. No.: 16/972,350

(22) PCT Filed: Jun. 4, 2019

(86) PCT No.: PCT/SE2019/050511
§ 371 (c)(1),
(2) Date: Dec. 4, 2020

(87) PCT Pub. No.: WO2019/245426
PCT Pub. Date: Dec. 26, 2019

(65) Prior Publication Data
US 2021/0235616 A1    Aug. 5, 2021

(30) Foreign Application Priority Data
Jun. 21, 2018 (SE) .................... 1850763-2

(51) Int. Cl.
*A01D 34/00* (2006.01)
*B60R 21/0136* (2006.01)
(Continued)

(52) U.S. Cl.
CPC ........ *A01D 34/008* (2013.01); *B60R 21/0136* (2013.01); *G05D 1/0227* (2013.01); *A01D 34/78* (2013.01); *A01D 2101/00* (2013.01)

(58) Field of Classification Search
CPC .... A01D 34/008; B60R 19/02; B60R 19/483; B60R 21/0136; A47L 2201/04; A47L 9/2805; H01H 3/141; H01H 3/16
See application file for complete search history.

(56) References Cited

U.S. PATENT DOCUMENTS 5,163,273 A * 11/1992 Wojtkowski ............ B60L 58/21
180/211
8,052,183 B2 * 11/2011 Hsu ........................ B25J 13/081
700/275
(Continued)

FOREIGN PATENT DOCUMENTS

CN       104135846 A       11/2014
CN       107409599 A       12/2017
(Continued)

OTHER PUBLICATIONS

International Search Report and Written Opinion for International Application No. PCT/SE2019/050511 dated Jun. 20, 2019.
(Continued)

*Primary Examiner* — Alicia Torres
(74) *Attorney, Agent, or Firm* — Burr & Forman LLP

(57) ABSTRACT

A self-propelled robotic lawnmower may include a lawnmower body, a body part movably arranged in relation to the lawnmower body, and an elongated sensor element extending in an interface between the lawnmower body and the body part. The elongated sensor element may be configured to generate a signal when a portion of the elongated sensor element is subjected to a change in thickness in a direction perpendicular to a direction of elongation of the elongated sensor element by a relative movement between the body part and the lawnmower body.

17 Claims, 3 Drawing Sheets

(51) Int. Cl.
*G05D 1/00* (2006.01)
*A01D 34/78* (2006.01)
*A01D 101/00* (2006.01)

(56) References Cited

U.S. PATENT DOCUMENTS

| | | | |
|---|---|---|---|
| 8,801,057 B2* | 8/2014 | Kim | G01D 5/165 |
| | | | 293/4 |
| 10,108,198 B2* | 10/2018 | Björn | G05D 1/0227 |
| 10,514,701 B2* | 12/2019 | Windorfer | G05D 1/0077 |
| 2008/0230361 A1 | 9/2008 | Chabach | |
| 2013/0241217 A1 | 9/2013 | Hikcey et al. | |
| 2014/0246874 A1* | 9/2014 | Hickey | A47L 11/4011 |
| | | | 293/4 |
| 2017/0042085 A1 | 2/2017 | Bjorn et al. | |
| 2018/0116109 A1* | 5/2018 | Matsumoto | A01D 34/008 |

FOREIGN PATENT DOCUMENTS

| | | | | |
|---|---|---|---|---|
| CN | 107479546 A | | 12/2017 | |
| DE | 102008003796 A1 | | 7/2009 | |
| EP | 1667183 A1 | | 6/2006 | |
| EP | 2783561 A1 | | 10/2014 | |
| FR | 2671316 A1 | * | 7/1992 | ............ B60R 19/18 |
| WO | 0191623 A2 | | 12/2001 | |
| WO | 2009087124 A2 | | 7/2009 | |
| WO | 2015154822 A1 | | 10/2015 | |

OTHER PUBLICATIONS

Swedish Office Action and Search Report for Swedish Application No. 1850763-2, dated Feb. 1, 2019.

* cited by examiner

ROBOTIC LAWN MOWER WITH SENSOR FOR DETECTING RELATIVE MOVEMENT BETWEEN BODY PARTS OF THE LAWN MOWER

TECHNICAL FIELD

The present disclosure relates to a self-propelled robotic lawnmower. More specifically, the present disclosure relates to a self-propelled robotic lawnmower comprising a sensor element.

BACKGROUND

Self-propelled robotic lawnmowers of different configurations are available on the market today which are capable of cutting grass in areas in an autonomous manner. Some robotic lawnmowers require a user to set up a border wire around a lawn that defines the area to be mowed. Such robotic lawnmowers use a sensor to locate the wire and thereby the boundary of the area to be trimmed. As an alternative to, or in addition to, a sensor arranged to locate a wire, robotic lawnmowers may comprise other types of positioning units, for example a space-based satellite navigation system such as a Global Positioning System (GPS).

A robotic lawnmower usually comprises one or more batteries and one or more driving units being powered by the one or more batteries. Some robotic lawnmowers comprise a photovoltaic module arranged to generate electricity from the sun's rays which may fully or partially provide an energy source for charging the one or more batteries. The robotic lawnmower may move in a systematic and/or random pattern to ensure that the area is completely cut. In some cases, the robotic lawnmower uses the wire to locate a recharging dock used to recharge the one or more batteries.

Generally, robotic lawnmowers operate unattended within the area in which they operate. Many gardens have more or less slopes, cavities, and obstacles, such as trees, fences, furniture, and the like. Furthermore, even though robotic lawnmowers usually operate unattended within the area in which they operate, people and animals may be present in the area. Therefore, some robotic lawnmowers comprise switches and/or sensors arranged to detect collisions between the lawnmower and an object within the area. Such switches and sensors can increase the reliability and operational safety of the robotic lawnmower. However, they add costs and complexity to the robotic lawnmower and may, in case of malfunction, significantly reduce the operational safety of the robotic lawnmower. Furthermore, a malfunction of one or more switches and/or sensors may cause standstill periods of the robotic lawnmower, which is burdensome for the user, and may cause high costs for service and repair.

In addition, generally, today's consumer market requires high quality products that comprise different features and functions while the products have conditions and/or characteristics suitable for being manufactured and assembled in a cost-efficient manner.

SUMMARY

It is an object of the present invention to overcome, or at least alleviate, at least some of the above-mentioned problems and drawbacks.

According to a first aspect of the invention, the object is achieved by a self-propelled robotic lawnmower comprising a lawnmower body, a body part movably arranged in relation to the lawnmower body, and an elongated sensor element extending in an interface between the lawnmower body and the body part. The elongated sensor element is configured to generate a signal when a portion of the elongated sensor element is subjected to a change in thickness, in a direction perpendicular to a direction of elongation of the elongated sensor element, by a relative movement between the body part and the lawnmower body.

Since the lawnmower comprises the elongated sensor element which is configured to generate a signal when a portion of the elongated sensor element is subjected to a change in thickness by a relative movement between the body part and the lawnmower body, a lawnmower is provided having conditions for detecting a relative movement between the body part and the lawnmower body, in a simple, efficient, and reliable manner. The relative movement between the body part and the lawnmower body may for example occur during an impact between the lawnmower and an object, such as a tree, a person, or the like, or when the lawnmower is lifted.

According to some embodiments of the present disclosure, and as is further explained herein, the body part is specifically a body part of the lawnmower that is likely to be used when lifting the lawnmower. According to such embodiments, a lift of the lawnmower can be detected in a simple, efficient, and reliable manner.

Since impacts and/or lifts of the lawnmower can be detected in a simple, efficient, and reliable manner, the operational safety of the lawnmower can be improved.

Moreover, since the lawnmower comprises the elongated sensor element extending in an interface between the lawnmower body and the body part, the elongated sensor elements can replace a number of switches and/or sensors previously used for detecting impacts between a lawnmower and an object. In this manner, the cost of the components of the lawnmower can be reduced, less costly and less complex electrical wiring to the sensor, or sensors, can be provided, and assembling of the lawnmower is facilitated and can thus be performed in a more cost-efficient manner. In addition, since a lower number of sensor elements are required, and since less complex electrical wiring can be used, a more robust and reliable lawnmower is provided.

Thus, a lawnmower is provided capable of detecting impacts and/or lifts in a simple, efficient, and reliable manner, while the lawnmower has conditions and characteristics suitable for being manufactured and assembled in a cost-efficient manner.

Accordingly, a lawnmower is provided overcoming, or at least alleviating, at least some of the above-mentioned problems and drawbacks. As a result, the above-mentioned object is achieved.

Optionally, the elongated sensor element is configured to generate the signal when a portion of the elongated sensor element is squeezed between the body part and the lawnmower body. Thereby, a lawnmower is provided capable of detecting impacts and/or lifts in a simple, efficient, and reliable manner. Furthermore, the elongated sensor element can provide a spring function between the body part and the lawnmower body, which thus circumvents the need for additional spring elements between these components. As a result thereof, a less costly and a less complex lawnmower is provided having conditions for a still simpler assembly of the lawnmower.

Optionally, at least one of the body part and the lawnmower body comprises one or more protrusions configured to abut against the elongated sensor element at least during the relative movement between the body part and the lawnmower body. Thereby, the force needed to change the thickness of the elongated sensor element is reduced. In this manner, the relative movement between the body part and the lawnmower body is facilitated which provides conditions for an even more reliable detection of an impact, and/or lift, of the lawnmower.

According to further embodiments of the present disclosure, the body part is movably arranged in relation to the lawnmower body in a manner providing a leverage effect such that a larger movement of the body part relative the lawnmower body is translated into a smaller movement at the interface in which the elongated sensor element extends. In this manner, the force needed to change the thickness of the elongated sensor element is further reduced, which provides conditions for an even more reliable detection of an impact, and/or a lift, of the lawnmower Optionally, the one or more protrusions comprises at least two protrusions arranged at a distance from each other along the direction of elongation of the elongated sensor element. Thereby, the sensing of relative movements between the body part and the lawnmower body at different portions along the elongated sensor element is facilitated. In this manner, the detection of an impact, and/or a lift, can be detected in a still more efficient and reliable manner.

Optionally, the elongated sensor element is elastic in directions perpendicular to the direction of elongation of the elongated sensor element. Thereby, a lawnmower is provided in which the body part can assume an original position when the force that caused a relative movement between the body part and the lawnmower body is removed. In this manner, the need for additional spring elements separating the body part from the lawnmower body is circumvented. In addition, the detection of a removal of a force onto a body part of the lawnmower is facilitated. Moreover, because the need for additional spring elements is circumvented, a less costly and a less complex lawnmower is provided having conditions for a still simpler assembly of the lawnmower.

Optionally, the lawnmower body comprises a first body portion, a second body portion, and a link arm connecting the first and second body portions, and wherein the body part is movably arranged at the link arm. Experience in the field has shown that the link arm is a component of the lawnmower that is likely to be used when lifting the lawnmower. Accordingly, since the body part is movably arranged at the link arm, a lawnmower is provided having conditions for an effective and reliable detection of a lift of the lawnmower in the link arm, as well as an impact between an object and the link arm. Thereby, a lawnmower is provided having conditions for a further improved operational safety.

Optionally, the body part is movably arranged at an underside of the link arm. Thereby, a lawnmower is provided having conditions for an effective and reliable detection of a lift of the lawnmower in the link arm. This because the link arm is a component of the lawnmower that is likely to be used when lifting the lawnmower, and since the body part is movably arranged at an underside of the link arm, it will move towards the link arm when lifting the lawnmower in the link arm.

Optionally, the lawnmower comprises wheels and a wheel housing adjacent to one of the wheels, and wherein the body part forms at least a portion of the wheel housing. Experience in the field has shown that the wheel housing is a component of the lawnmower that is likely to be used when lifting the lawnmower. Accordingly, since the body part forms at least a portion of the wheel housing, a lawnmower is provided having conditions for an effective and reliable detection of a lift of the lawnmower in the wheel housing. Thereby, a lawnmower is provided having conditions for a further improved operational safety.

Optionally, the body part is an upper body part. Thereby, a lawnmower is provided capable of detecting events, such as impacts or lifts occurring from above. An impact from above may for example occur when the lawnmower is driving under an obstacle, such as a low tree branch, a furniture, a fence, or the like, and becomes squeezed under the obstacle. Accordingly, since the body part is an upper body part, a lawnmower is provided capable of detecting such events. As a result thereof, the operational reliability and the safety of operation can be further improved.

Optionally, the body part is a bumper of the lawnmower. Thereby, a lawnmower is provided capable of detecting events, such as impacts occurring for example when the lawnmower is driving into an obstacle, such as a tree, a furniture, a person, or the like. Accordingly, since the body part is a bumper of the lawnmower, a lawnmower is provided capable of detecting such events. Furthermore, a lawnmower is provided capable of detecting lifts of the lawnmower in cases where a user lifts the lawnmower in the bumper. Accordingly, due to these features, the operational reliability and the safety of operation can be further improved.

According to some embodiments of the present disclosure, the lawnmower body, as referred to herein, may comprise a lawnmower chassis being supported by one or more wheels of the lawnmower.

Optionally, the elongated sensor element comprises at least two conductors, and wherein the elongated sensor element is configured to generate the signal by short-circuiting the at least two conductors. Thereby, relative movements between the body part and the lawnmower body is detected in a simple, efficient, and reliable manner.

Optionally, the elongated sensor element is a switch cord. Thereby, a lawnmower is provided capable of detecting impacts and/or lifts in a simple, efficient, and reliable manner, while the lawnmower has conditions and characteristics suitable for being manufactured and assembled in a cost-efficient manner.

According to some embodiments of the present disclosure, the elongated sensor element may comprise a profile co-extruded by conductive and non-conductive rubber material, wherein at least two conductive portions of the cross section of the elongated sensor element are separated by a non-conductive portion.

Optionally, one of the lawnmower body and the body part comprises a groove and wherein the elongated sensor element is arranged in the groove. Thereby, a lawnmower is provided having conditions and characteristics suitable for being manufactured and assembled in a cost-efficient manner. Furthermore, a robust and reliable lawnmower is provided because the elongated sensor element is held in a more secure manner in the interface between the lawnmower body and the body part.

Optionally, the elongated sensor element is a switch mat. Thereby, a lawnmower is provided capable of detecting impacts and/or lifts in a simple, efficient, and reliable manner, while the lawnmower has conditions and characteristics suitable for being manufactured and assembled in a cost-efficient manner. Moreover, a lawnmower is provided capable of detecting impacts and/or lifts occurring at a variety of portions of the body part.

Optionally, the lawnmower comprises a control unit, a cutting unit, and a propulsion system configured to propel the lawnmower, wherein the control unit is configured to detect signals generated by the elongated sensor element, and in response to a detection of a signal, stop operation of the cutting unit, and/or stop operation of the propulsion system. Thereby, a safer and more reliable lawnmower is provided because upon a relative movement between the body part and a lawnmower body, for example caused by an impact or a lift of the lawnmower, the control unit will stop operation of the cutting unit, and/or stop operation of the propulsion system.

Optionally, the control unit is configured to generate a control signal through the elongated sensor element, and wherein the elongated sensor element is configured to generate the signal by short-circuiting the control signal. Thereby, a still safer and more reliable lawnmower is provided because the control unit is able to also detect cases where the elongated sensor element is damaged or removed.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
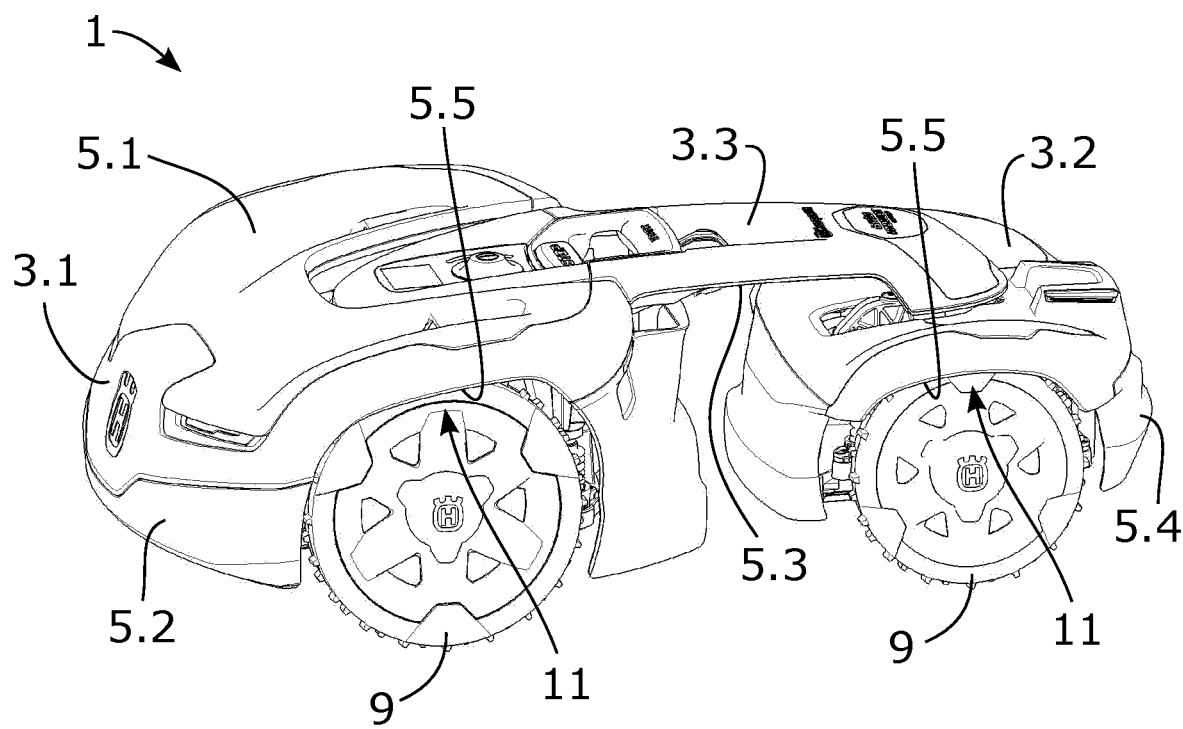
FIG. 1 illustrates a perspective view of a self-propelled robotic lawnmower, according to some embodiments.

FIG. 1 illustrates a perspective view of a self-propelled robotic lawnmower 1, according to some embodiments. For the reason of brevity and clarity, the self-propelled robotic lawnmower 1 is in most places herein referred to as "the lawnmower 1". The lawnmower 1 comprises a lawnmower body 3.1, 3.2, 3.3, which according to the illustrated embodiments comprises a first body portion 3.1, a second body portion 3.2, and a link arm 3.3 connecting the first and second body portions 3.1, 3.2. According to these embodiments, the first body portion 3.1 is a front body portion and the second body portion 3.2 is a rear body portion. The second body portion 3.2 is pivotally arranged to the link arm 3.3, in a substantially vertical pivot axis, such that the second body part 3.2 can pivot relative the link arm 3.3, and thus also relative the first body portion 3.1, to provide steering of the lawnmower 1. Each of the respective first and second body parts 3.1, 3.2 comprises wheels 9 arranged to support the respective body part 3.1, 3.2. The wheels 9 are each driven by an electric motor, as is further explained herein.

The lawnmower 1 comprises a number of body parts 5.1, 5.2, 5.3, 5.4, 5.5 each movably arranged in relation to the lawnmower body 3.1, 3.2, 3.3. According to the illustrated embodiments, these body parts 5.1, 5.2, 5.3, 5.4, 5.5 comprise an upper body part 5.1, in the form of an upper cover plate of the first body portion 3.1, a first bumper 5.2, in the form of a front bumper arranged at a front section of the first body portion 3.1, a body part 5.3 movably arranged at an underside of the link arm 3.3, a second bumper 5.4, in the form of a rear bumper arranged at a rear section of the second body portion 3.2, and body parts 5.5 forming at least portions of wheel housings 11 of the lawnmower 1.

As is further explained herein, according to the illustrated embodiments, the lawnmower 1 comprises elongated sensor elements extending in interfaces between the lawnmower body 3.1, 3.2, 3.3 and the respective body part 5.1, 5.2, 5.3, 5.4, 5.5. The elongated sensor elements are configured to generate a signal when a portion of the elongated sensor element is subjected to a change in thickness by a relative movement between the body part 5.1, 5.2, 5.3, 5.4, 5.5 and the lawnmower body 3.1, 3.2, 3.3. In this manner, an event, such as an impact between the lawnmower 1 and an obstacle, or a lift of the lawnmower 1, can be detected in a simple, efficient and a reliable manner. For example, if the lawnmower 1 is driving in a forward direction into an obstacle, the first bumper 5.2 will be displaced towards the first body portion 3.1, and the elongated sensor element arranged in an interface between the first bumper 5.2 and the first body portion 3.1 will as a result thereof generate a signal due to the change in thickness caused by the relative movement between the first bumper 5.2 and the first body portion 3.1. As another example, if the lawnmower 1 is driving in a reverse direction into an obstacle, the second bumper bumper 5.4 will be displaced towards the second body portion 3.2. As a result thereof, the elongated sensor element arranged in an interface between the second bumper 5.4 and the second body portion 3.2 will generate a signal due to the change in thickness caused by the relative movement between the second bumper 5.4 and the second body portion 3.2.

As yet another example, if the lawnmower 1 subjected to an impact from above, for example when driving under an obstacle, such as a low tree branch, a furniture, or the like, the upper body part 5.1 will be displaced towards the first body portion 3.1. As a result thereof, the elongated sensor element arranged in an interface between the upper body part 5.1 and the first body portion 3.1 will generate a signal due to the change in thickness caused by the relative movement between the upper body part 5.1 and the first body portion 3.1.

As a further example, if the lawnmower 1 is lifted, for example using one of the wheel housings 11, the body part 5.5 which forms at least a portion of the wheel housing 11 of the lawnmower 1 will be displaced towards the body portion 3.1, 3.2 of the lawnmower body 3.1, 3.2, 3.3. As a result, the elongated sensor element arranged in an interface between the body part 5.5 and the body portion 3.1, 3.2 will generate a signal due to the change in thickness caused by the relative movement between body part 5.5 and the body portion 3.1, 3.2. As yet another example, if the lawnmower is lifted in the link arm 3.3, the body part 5.3 arranged at the underside of the link arm 3.3 will be displaced towards the link arm 3.3. As a result, the elongated sensor element arranged in an interface between the body part 5.3 and the link arm 3.3 will generate a signal due to the change in thickness caused by the relative movement between body part 5.3 and the link arm 3.3.

As is further explained herein, the signals generated by one or more elongated sensor elements may be detected by a control unit, which may perform safety enhancing measures in case of a detection of a signal.

Figure 2:
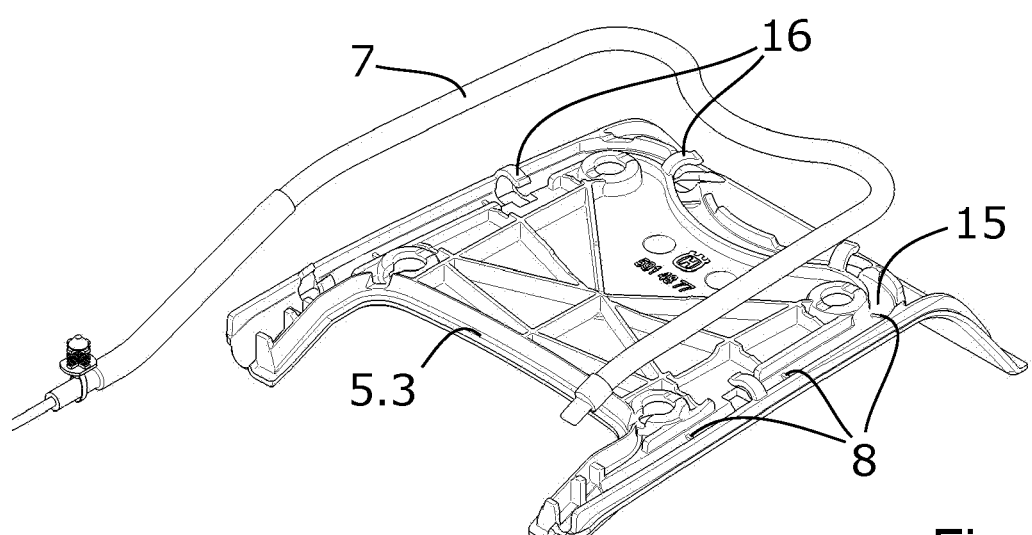
FIG. 2 illustrates an elongated sensor element and a body part arranged at an underside of a link arm of the lawnmower illustrated in FIG. 1.

FIG. 2 illustrates an elongated sensor element 7 and the body part 5.3 arranged at the underside of the link arm 3.3 of the lawnmower 1 illustrated in FIG. 1. In FIG. 2, the sensor element 7 is illustrated in an unassembled state. According to the illustrated embodiments, the elongated sensor element 7 is a switch cord. The features of the elongated sensor element 7 according to these embodiments is further explained with reference to FIG. 4 below. According to the illustrated embodiments, the body part 5.3 comprises a groove 15. The elongated sensor element 7 is configured to be arranged in the groove 15. The body part 5.3 comprises a number of flexible hooks 16. The flexible hooks 16 are configured to retain the elongated sensor element 7 in the groove 15 when the elongated sensor element 7 is arranged in the groove 15.

Moreover, as can be seen in FIG. 2, according to the illustrated embodiments, the body part 5.3 comprises a number of protrusions 8 protruding from a surface of the groove 15. The protrusions 8 are configured to operatively abut against the elongated sensor element 7 at least during the relative movement between the body part 5.3 and the lawnmower body. According to the illustrated embodiments, the protrusions 8 are configured to abut against the elongated sensor element 7 when the elongated sensor element 7 is arranged in the groove 15. That is, according to the illustrated embodiments, the protrusions 8 are configured to abut against the elongated sensor element 7 also when no relative movement between the body part 5.3 and the lawnmower body is occurring. The protrusions 8 facilitate actuation of the elongated sensor element 7 because they ensure a more local change in thickness of the elongated sensor element upon movement of the body part 5.3 relative the lawnmower body. Furthermore, as can be seen in FIG. 2, according to the illustrated embodiments, the protrusions 8 are arranged at a distance from each other along the direction of elongation of the elongated sensor element and are substantially evenly distributed along a length of the elongated sensor element 7.

As is further explained herein, according to some embodiments of the present disclosure, the elongated sensor element 7 is configured to generate a signal when a portion of the elongated sensor element 7 is squeezed between a body part 5.3 and the lawnmower body. According to such embodiments, the protrusions 8 may be configured to squeeze the elongated sensor element 7 by abutting against the elongated sensor element 7.

According to some further embodiments of the present disclosure, the elongated sensor element 7 is configured to generate a signal when a portion of the elongated sensor element 7 is expanded, i.e. subjected to an increase in thickness, by a relative movement between the body part 5.3 and the lawnmower body. According to such embodiments, the protrusions 8 may be configured to expand the elongated sensor element 7 by an abutting contact against the elongated sensor element 7. The protrusions 8 may, according to such embodiments, be attached to the elongated sensor element 7, for example using glue.

Figure 3:
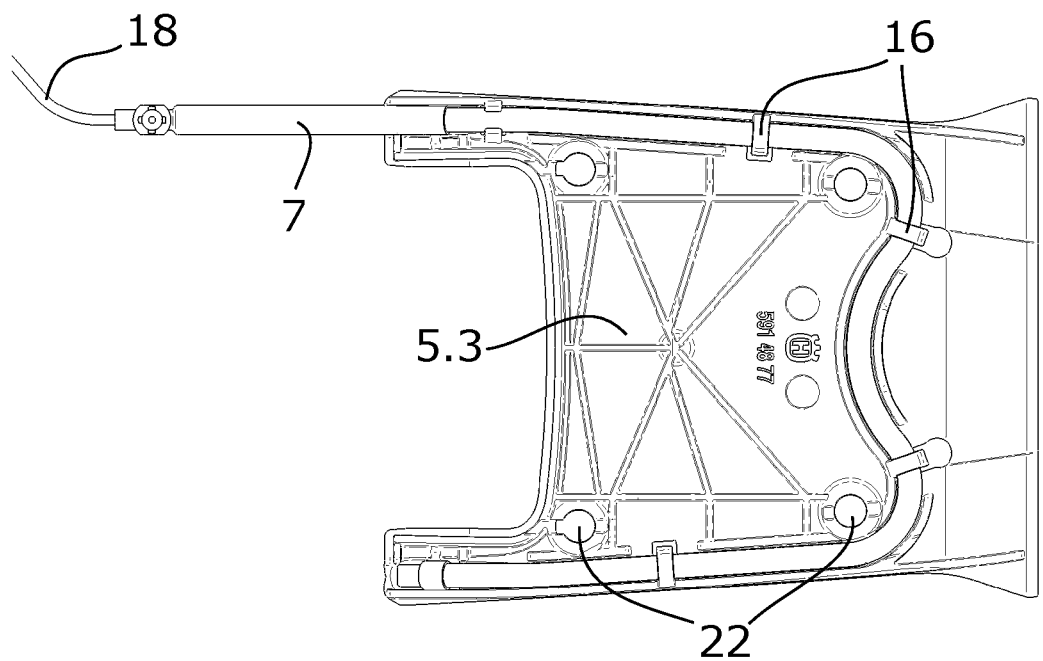
FIG. 3 illustrates the elongated sensor element and the body part illustrated in FIG. 2 with the elongated sensor element in a mounted position.

FIG. 3 illustrates the elongated sensor element 7 and the body part 5.3 illustrated in FIG. 2 with the elongated sensor element 7 in a mounted position. As can be seen in FIG. 3, the hooks 16 hold the elongated sensor element 7 towards the body part 5.3 by at least partially enclosing the elongated sensor element 7. Furthermore, as is evident from FIG. 2 and FIG. 3, due to these features, the elongated sensor element 7 is simple to mount to the body part 5.3. For example, an assembler may grab the elongated sensor element 7, as illustrated in FIG. 2, and position the elongated sensor element 7 adjacent to openings of the hooks 16 and gently press the elongated sensor element 7 into the groove 15. The resulting arrangement will look like the arrangement illustrated in FIG. 3. Thus, according to the illustrated embodiments, the elongated sensor element 7 can be attached to the body part 5.3 in a simple manner without using tools.

Further advantages of the present solution are apparent when viewing FIG. 3. For example, because the elongated sensor element 7 is elongated and extends in the interface between the body part 5.3 and the lawnmower body, one elongated sensor element 7 is capable of detecting relative movements of different portions of the body part 5.3 relative the lawnmower body. That is, according to the illustrated embodiments, the elongated sensor element 7 is configured to generate a signal when a portion of the elongated sensor element 7, along substantially the full length of the elongated sensor element 7 in the interface, is subjected to a change in thickness. Thereby, for example if a corner of the body part 5.3, or a side of the body part 5.3, is moved towards the lawnmower body, the portion of the elongated sensor element 7 at the corner, or at the side, will be subjected to a change in thickness. As a result thereof, a lawnmower is provided capable of generating signals when different portions of a body part 5.3 is moved relative the lawnmower body in a manner circumventing the need for using more than one sensor element per movable body part 5.3.

Furthermore, in FIG. 3, a cable 18 of the elongated sensor element 7 is indicated. Since the need for using more than one sensor element per movable body part 5.3 is circumvented, only one cable 18 is needed for connecting the elongated sensor element 7 to a control unit of the lawnmower. In this manner, a more robust and reliable lawnmower is provided.

Figure 4:
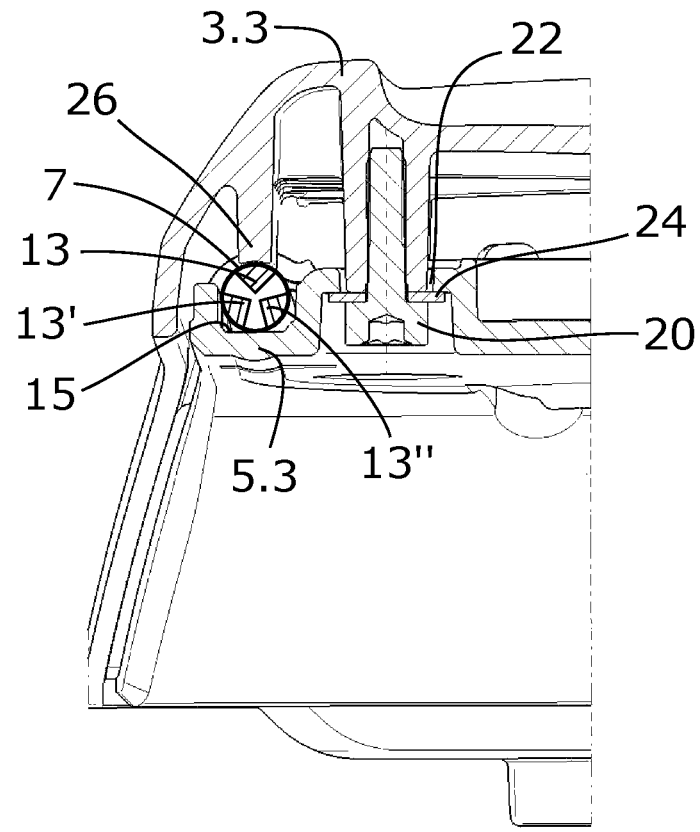
FIG. 4 illustrates a cross section through a portion of the link arm of the lawnmower illustrated in FIG. 1, FIG. 5 schematically illustrates an elongated sensor element according to some further embodiments, and FIG. 6 illustrate a second perspective view of the lawnmower illustrated in FIG. 1.

FIG. 4 illustrates a cross section through a portion of the link arm 3.3 of the lawnmower 1, illustrated in FIG. 1. In FIG. 4 the cross section is made in a substantially vertical plane. The body part 5.3 is movably arranged at the underside of the link arm 3.3 by bolts 20 extending through holes 22 of the body part 5.3. The holes 22 of the body part 5.3 are also indicated in FIG. 3. A washer 24 is positioned between a head of the bolt 20 and the link arm 3.3. In an unactuated state, the body part 5.3 rests against the washer 24. The body part 5.3 can be moved from the washer 24 in a direction upward in FIG. 4, for example by applying a force onto the body part 5.3 in a direction upwards in FIG. 4. Furthermore, as can be seen in FIG. 4, the elongated sensor element 7 extends in an interface between the body part 5.3 and the link arm 3.3. The link arm comprises a rib 26 which faces the elongated sensor 7. Upon a movement of the body part 5.3 towards the link arm 3.3, i.e. upon a movement of the body part 5.3 upwards in FIG. 4, the distance between delimiting surfaces of the interface is reduced. According to the embodiments illustrated in FIG. 4, the delimiting surfaces are surfaces of the rib 26 and surfaces of the groove 15. As a result of the movement of the body part 5.3 towards the link arm 3.3, the elongated sensor element 7 is subjected to a reduction in thickness.

As can be seen in FIG. 4, the elongated sensor element 7 comprises three conductors 13, 13', 13". The elongated sensor element 7, 7' is configured to generate the signal by short-circuiting at least two of the conductors 13, 13', 13". This will occur when a portion of the elongated sensor element 7 is subjected to a sufficient reduction in thickness.

The elongated sensor element 7 may comprise another number of conductors 13, 13', 13" than three, such as two, four or five. The elongated sensor element 7 may comprise a profile co-extruded by conductive and non-conductive rubber material, wherein at least two conductive portions, i.e. conductors 13, 13', 13", of the cross section of the elongated sensor element 7 are separated by a non-conductive portion. According to the illustrated embodiments, the non-conductive portions comprises air between the conductors 13, 13', 13".

Below, simultaneous reference is made to FIG. 1-FIG. 4. As understood from the above, according to the illustrated embodiments, the elongated sensor element 7 is configured to generate the signal when a portion of the elongated sensor element 7 is squeezed between a body part 5.1, 5.2, 5.3, 5.4, 5.5 and the lawnmower body 3.1, 3.2, 3.3. Moreover, the the elongated sensor element 7 is elastic in directions perpendicular to a direction of elongation of the elongated sensor element 7. According to the illustrated embodiments, the elasticity of the elongated sensor element 7 is obtained by an elastic cover of the elongated sensor element 7.

The embodiments described with reference to the FIG. 2-FIG. 4 relate to the body part 5.3 movably arranged at the underside of the link arm 3.3. However, the other body parts 5.1, 5.2, 5.4, 5.5 described herein, and the elongated sensor elements arranged in interfaces between these body parts 5.1, 5.2, 5.4, 5.5 and the lawnmower body 3.1, 3.2, 3.3, may comprise same or corresponding features, functions, and advantages as those described with reference to FIG. 2-FIG. 4.

Figure 5:
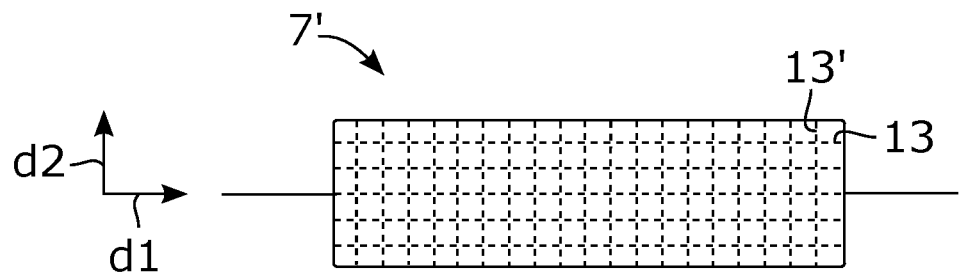

FIG. 5 schematically illustrates an elongated sensor element 7' according to some further embodiments. According to these embodiments, the elongated sensor element 7' is a switch mat. The elongated sensor element 7' comprises a first set of conductors 13 extending across the elongated sensor element 7' in a first direction d1, and a second set of conductors 13' extending across the elongated sensor element 7' in a second direction d2. The second set of conductors 13' may be arranged at a distance from the first set of conductors 13 in a direction perpendicular to the first and second directions d1, d2. Since the elongated sensor element 7', according to these embodiments, is a switch mat, the elongated sensor element 7' comprises two directions of elongation, i.e. in FIG. 5, the first and second directions d1, d2. When a portion of the elongated sensor element 7' is subjected to a change in thickness in a direction perpendicular to the directions of elongation d1, d2 of the elongated sensor element 7', the elongated sensor element 7' generates a signal.

Accordingly, the lawnmower 1 illustrated in FIG. 1, may as an alternative to, or in addition to, one or more switch cords described above, comprise one or more elongated sensor elements 7' according to the embodiments illustrated in FIG. 5. Thus, the elongated sensor element 7' illustrated in FIG. 5 may extend in an interface between the lawnmower body 3.1, 3.2, 3.3 and a body part 5.1, 5.2, 5.3, 5.4, 5.5 such that the elongated sensor element 7' generates a signal upon a relative movement between the body part 5.1, 5.2, 5.3, 5.4, 5.5 and the lawnmower body 3.1, 3.2, 3.3.

According to some embodiments of the present disclosure, the elongated sensor element 7 according to the embodiments illustrated in FIG. 2-FIG. 4, as well as the elongated sensor element 7' according to the embodiments illustrated in FIG. 5, is configured to generate the signal when a portion of the elongated sensor element 7, 7' is expanded, i.e. subjected to an increase in thickness, by a relative movement between the body part 5.1, 5.2, 5.3, 5.4, 5.5 and the lawnmower body 3.1, 3.2, 3.3. According to such embodiments, the conductors of the elongated sensor element may be in electrical contact in the unactuated, unexpanded state, and may be brought into relative positions where they lack electrical contact in the actuated, expanded state. Furthermore, according to such embodiments, the elongated sensor element 7, 7' may be attached to delimiting surfaces of the interface between the body part 5.1, 5.2, 5.3, 5.4, 5.5 and the lawnmower body 3.1, 3.2, 3.3, for example using glue.

Figure 6:
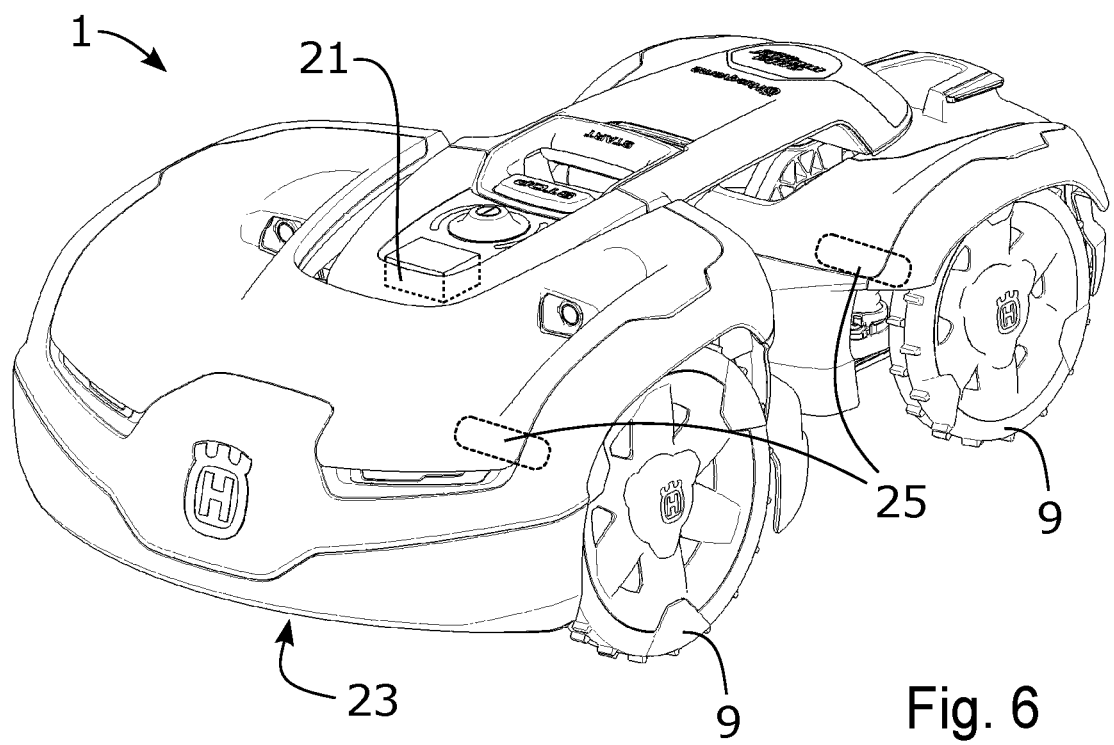

FIG. 6 illustrate a second perspective view of the lawnmower 1 illustrated in FIG. 1. As indicated in FIG. 6, the lawnmower 1 comprises a control unit 21, a cutting unit 23, and a propulsion system 25. The propulsion system 25 comprises a set of electrical motors configured to power wheels 9 of the lawnmower 1. The lawnmower 1 comprises one or more batteries arranged to supply electricity to the propulsion system 25 by an amount controlled by the control unit 21. According to the illustrated embodiments, the lawnmower 1 comprises four wheels 9 and four electrical motors. In FIG. 6, only two wheels and two motors are visible and indicated. Each electric motor is configured to power one wheel 9. The cutting unit 23 is configured to cut vegetation, such as grass, during operation of the lawnmower 1. The cutting unit 23 may comprise one or more cutting rotors, such as cutting discs. The control unit 21 is configured to control operation of the cutting unit 23 and the propulsion system 25.

Moreover, the control unit 21 is connected to one or more elongated sensor elements of the lawnmower 1 and is configured to detect signals generated by the one or more elongated sensor elements, and in response to a detection of a signal, stop operation of the cutting unit 23, and/or stop operation of the propulsion system 25.

According to some embodiments of the present disclosure, the control unit 21 is configured to generate a control signal through the one or more elongated sensor elements, and wherein each elongated sensor element is configured to generate the signal by short-circuiting the control signal. Thus, according to such embodiments, the control unit 21 may generate a control signal through the one or more elongated sensor elements during operation of the lawnmower 1 and may in response to the detection of a missing control signal in one or more elongated sensor elements, perform safety enhancing measures, such as stopping operation of the cutting unit 23, and/or stopping operation of the propulsion system 25.

According to some embodiments of the present disclosure, the control unit 21 is configured to separate between different events and may be configured to perform an action in dependence of a determined type of event. In the following, simultaneous reference is made to FIG. 1 and FIG. 6. If one of the elongated sensor elements at a body part 5.3, 5.5 that is likely to be used when lifting the lawnmower 1 generates a signal, the control unit 21 may determine that a lift of the lawnmower is occurring. Examples of body parts 5.3, 5.5 that are likely to be used when lifting the lawnmower 1 are the body part 5.3 arranged at the underside of the link arm 3.3 and a body part 5.5 that forms at least a portion of the wheel housing 11 of the lawnmower 1. If one of the elongated sensor elements at a body part 5.2, 5.4 that is likely to be displaced during an impact generate a signal, the control unit 21 may determine that an impact is occurring. Examples of body parts 5.2, 5.4 that are likely to be displaced during an impact between the lawnmower 1 and an obstacle are the front bumper 5.2 and the rear bumper 5.4. If one of the elongated sensor elements at an upper body part 5.1 generates a signal, the control unit 21 may determine that the lawnmower 1 is squeezed under an obstacle.

Accordingly, the control unit 21 may be configured to separate between events as those described above. As an example, if it is detected that an impact is occurring, the control unit 21 may reverse the propulsion of the propulsion system 25 but may continue operation of the cutting unit 23. As another example, if it is detected that the lawnmower 1 is lifted, the control unit 21 may stop operation of the propulsion system 25 and may stop operation of the cutting unit 23. As a further example, if it is detected that the lawnmower 1 is squeezed under an obstacle, the control unit 21 may stop operation of the cutting unit 23 and reverse operation of the propulsion system 25.

As mentioned, the lawnmower 1, as referred to herein is a self-propelled robotic lawnmower 1, which means that the lawnmower 1 is capable of cutting grass in an at least partially autonomous manner which, at least during periods of operation, does not require intervention of a user. The lawnmower 1 may further comprise one or more sensors arranged to sense a magnetic field of a wire, and/or one or more positioning units, allowing the lawnmower 1 to navigate and to cut an area in an autonomous manner. The control unit 21 may control the lawnmower 1 to move in a systematic and/or random pattern to ensure that the area is completely cut. In addition, the lawnmower 1 may comprise a communication unit connected to the control unit 21. The communication unit may be configured to communicate with a remote communication unit to receive instructions therefrom and/or to send information thereto. The communication may be performed wirelessly over a wireless connection such as the internet, or a wireless local area network (WLAN), or a wireless connection for exchanging data over short distances using short-wavelength, i.e. ultra-high frequency (UHF) radio waves in the industrial, scientific and medical (ISM) band from 2.4 to 2.485 GHz.

The control unit 21, as referred to herein, may comprise a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, a microprocessor, or other processing logic that may interpret and execute instructions. The herein utilised expression "calculation unit" may represent a processing circuitry comprising a plurality of processing circuits, such as, e.g., any, some or all of the ones mentioned above.

The control unit 21 may further comprise a memory unit, wherein the calculation unit may be connected to the memory unit, which may provide the calculation unit with, for example, stored program code and/or stored data which the calculation unit may need to enable it to do calculations. The calculation unit may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, or another similar volatile or non-volatile storage unit for storing data.

The control unit 21 is connected to components of the lawnmower 1 for receiving and/or sending input and output signals. These input and output signals may comprise waveforms, pulses or other attributes which the input signal receiving devices can detect as information and which can be converted to signals processable by the control unit 21. These signals may then be supplied to the calculation unit.

In the embodiments illustrated, the lawnmower 1 comprises a control unit 21 but might alternatively be implemented wholly or partly in two or more control arrangements or two or more control units.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The lawnmower body, as referred to herein, may comprise a lawnmower chassis being supported by one or more wheels of the lawnmower. Therefore, throughout this disclosure, the wording "lawnmower body" may be replaced by the wording "lawnmower chassis".

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A self-propelled robotic lawnmower comprising:
a lawnmower body,
a body part movably arranged in relation to the lawnmower body, and
an elongated sensor element extending in an interface between the lawnmower body and the body part,
wherein the elongated sensor element is configured to generate a signal when a portion of the elongated sensor element is subjected to a change in thickness, in a direction perpendicular to a direction of elongation of the elongated sensor element, by a relative movement between the body part and the lawnmower body,
wherein the lawnmower body comprises a first body portion, a second body portion, and a link arm connecting the first and second body portions, and wherein the body part is movably arranged at the link arm, and
wherein the body part is movably arranged at an underside of the link arm.

2. The lawnmower according to claim 1, wherein the elongated sensor element is configured to generate the signal when a portion of the elongated sensor element is squeezed between the body part and the lawnmower body.

3. The lawnmower according to claim 1, wherein at least one of the body part and the lawnmower body comprises one or more protrusions configured to abut against the elongated sensor element at least during the relative movement between the body part and the lawnmower body.

4. The lawnmower according to claim 3, wherein the one or more protrusions comprises at least two protrusions arranged at a distance from each other along the direction of elongation of the elongated sensor element.

5. The lawnmower according to claim 1, wherein the elongated sensor element is elastic in directions perpendicular to the direction of elongation of the elongated sensor element.

6. The lawnmower according to claim 1, wherein the lawnmower comprises wheels and a wheel housing adjacent to one of the wheels, and wherein the body part forms at least a portion of the wheel housing.

7. The lawnmower according to claim 1, wherein the body part is an upper body part.

8. The lawnmower according to claim 1, wherein the body part is a bumper of the lawnmower.

9. The lawnmower according to claim 1, wherein the elongated sensor element comprises at least two conductors, and wherein the elongated sensor element is configured to generate the signal by short-circuiting the at least two conductors.

10. The lawnmower according to claim 1, wherein the elongated sensor element is a switch cord.

11. The lawnmower according to claim 1, wherein one of the lawnmower body and the body part comprises a groove, and wherein the elongated sensor element is arranged in the groove.

12. The lawnmower according to claim 1, wherein elongated sensor element is a switch mat.

13. The lawnmower according to claim 1, wherein the lawnmower comprises:
a control unit,
a cutting unit, and
a propulsion system configured to propel the lawnmower, and wherein the control unit is configured to detect signals generated by the elongated sensor element, and in response to a detection of a signal, stop operation of the cutting unit, and/or stop operation of the propulsion system.

14. The lawnmower according to claim 13, wherein the control unit is configured to generate a control signal through the elongated sensor element, and wherein the elongated sensor element is configured to generate the signal by short-circuiting the control signal.

15. A self-propelled robotic lawnmower comprising:
a lawnmower body,
a body part movably arranged in relation to the lawnmower body, and
an elongated sensor element extending in an interface between the lawnmower body and the body part,
a control unit,
a cutting unit, and
a propulsion system configured to propel the lawnmower,
wherein the control unit is configured to detect signals generated by the elongated sensor element, and in response to a detection of a signal, stop operation of the cutting unit, and/or stop operation of the propulsion system,
wherein the elongated sensor element is configured to generate a signal when a portion of the elongated sensor element is subjected to a change in thickness, in a direction perpendicular to a direction of elongation of the elongated sensor element, by a relative movement between the body part and the lawnmower body,
wherein the control unit is configured to generate a control signal through the elongated sensor element, and
wherein the elongated sensor element is configured to generate the signal by short-circuiting the control signal.

16. The lawnmower according to claim 15, wherein the lawnmower body comprises a first body portion, a second body portion, and a link arm connecting the first and second body portions, and wherein the body part is movably arranged at the link arm.

17. The lawnmower according to claim 16, wherein the body part is movably arranged at an underside of the link arm.

* * * * *